United States Patent
Tebben et al.

(10) Patent No.: US 11,005,838 B2
(45) Date of Patent: May 11, 2021

(54) COMPUTER IMPLEMENTED MONITORING PROCESS FOR PERSONALIZED EVENT DETECTION AND NOTIFICATION TRANSMISSION

(71) Applicant: ORACLE INTERNATIONAL CORPORATION, Redwood Shores, CA (US)

(72) Inventors: Michael Tebben, Aurora, CO (US); Haiyan Wang, Parker, CO (US); Nicole Laurent, Lakewood, CO (US); Qiu Zhong, Greenwood Village, CO (US); Aaron Johnson, Castle Pines, CO (US); Darryl M. Shakespeare, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 353 days.

(21) Appl. No.: 15/979,935

(22) Filed: May 15, 2018

(65) Prior Publication Data

US 2019/0356654 A1 Nov. 21, 2019

(51) Int. Cl.
*H04L 29/06* (2006.01)
*G06F 21/62* (2013.01)
(Continued)

(52) U.S. Cl.
CPC .......... *H04L 63/0853* (2013.01); *G06F 9/542* (2013.01); *G06F 16/245* (2019.01);
(Continued)

(58) Field of Classification Search
CPC ... H04L 63/0853; H04L 63/20; G06F 16/245; G06F 9/542; G06F 21/6218; G06F 21/62; G06Q 30/0633
See application file for complete search history.

(56) References Cited

U.S. PATENT DOCUMENTS

| | | | | |
|---|---|---|---|---|
| 9,813,882 | B1* | 11/2017 | Masterman | ............. H04W 4/18 |
| 2006/0253281 | A1* | 11/2006 | Letzt | ...................... G10L 15/30 |
| | | | | 704/231 |

(Continued)

OTHER PUBLICATIONS

Crouch, Michelle: "How to Sign Up for Bank Alerts on Your Cellphone", Credit.com, pp. 1-12, Jun. 9, 2015,retrieved from the internet on Jul. 19, 2020 at >www.creditcards.conn/credit-card-news/credit-card-alerts-cellphone-1273/ (Year: 2015).*

(Continued)

*Primary Examiner* — Paul E Callahan
(74) *Attorney, Agent, or Firm* — Kraguljac Law Group, LLC

(57) ABSTRACT

Systems, methods, and other embodiments associated with a monitoring process for event detection and notification transmission are described. In one embodiment, a method includes configuring a monitoring process with a matching rule used to evaluate data sources of an enterprise computing environment to determine if an event has occurred. The example method may also include executing the monitor process to identify a set of subscribers and establish a trust relationship. The example method may also include, for each subscriber, executing the monitoring process to impersonate a subscriber, execute the matching rule upon data sources accessible to the subscriber to perform a test as to whether the event has occurred, and transmit a message of the event if the event occurred.

18 Claims, 9 Drawing Sheets

(51) Int. Cl.
*G06F 9/54* (2006.01)
*G06F 16/245* (2019.01)
*G06Q 30/06* (2012.01)

(52) U.S. Cl.
CPC .......... *G06F 21/6218* (2013.01); *H04L 63/20* (2013.01); *G06F 21/62* (2013.01); *G06Q 30/0633* (2013.01)

(56) References Cited

U.S. PATENT DOCUMENTS

| | | | |
|---|---|---|---|
| 2007/0089167 A1* | 4/2007 | Villavicencio | H04L 67/306 726/5 |
| 2018/0101691 A1* | 4/2018 | Das | H04L 63/102 |
| 2019/0306157 A1* | 10/2019 | Lores | H04L 9/3247 |
| 2019/0392378 A1* | 12/2019 | Alvo | G06Q 10/087 |

OTHER PUBLICATIONS

Oracle, JD Edwards EnterpriseOne Tools Documentation, Release 9.2 Update 2 (9.2.2) Oct. 2017; Notification Guide, Designing a Notification, pp. 1-3, downloaded Mar. 9, 2018 from: https://docs.oracle.com/cd/E53430_01/EOTNF/design_notif.htm#EOTNF128.
Oracle, JD Edwards EnterpriseOne Tools Documentation, Release 9.2 Update 2 (9.2.2) Oct. 2017; Notification Guide, Creating Notifications with Orchestrator Studio 6.0.0, pp. 1-8, downloaded Mar. 9, 2018 from: https://docs.oracle.com/cd/E53430_01/EOTNF/design_notif.htm#EOTNF137.

* cited by examiner

COMPUTER IMPLEMENTED MONITORING PROCESS FOR PERSONALIZED EVENT DETECTION AND NOTIFICATION TRANSMISSION

BACKGROUND

An enterprise computing environment, such as an enterprise resource planning (ERP) system or other data processing environment, can be used by subscribers to store data, develop and execute applications and business logic, etc. In one example, an accountant of a business may store and access financial data within certain tables and rows of tables maintained within a database of the enterprise computing environment. A security module of the enterprise computing environment defines and enforces a user role and access permissions for the accountant to access those particular tables and rows, but not other tables and rows. Similarly, a warehouse manager of the business may store and access inventory data within certain tables and rows maintained within the database. The security module may define and enforce a user role and access permissions for the warehouse manager to access those particular tables and rows, but not other tables and rows.

The subscribers of the enterprise computing environment may write individual custom scripts or other executable modules to receive notifications of events. For example, the accountant may write a script to query a particular row of a table to determine whether a bank account total stored within the row is less than a threshold, thus indicative of a low balance event. Similarly, the warehouse manager may write a separate script to query a different row of a different table to determine whether an inventory level is less than a threshold, thus indicative of a low inventory event. Because the enterprise computing environment may maintain data for hundreds of thousands or more of users, generating and storing individual scripts and queries for each of these users consumes a large amount of processing and storage resources, and requires a substantial amount of manual interaction with computers to develop of execute each of the scripts.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that provide for a monitoring process for event detection. In one embodiment, the present system configures a monitoring process with a matching rule. The matching rule is used to evaluate data within data sources of an enterprise computing environment to determine whether an event has occurred. Any type of event can be monitored, such as a low available storage event for a storage device, a computer program execution crash event, a kernel panic event, a purchase order discrepancy event, a lease expiration event, or any other type of event identifiable from the data stored in the enterprise computing environment.

Rather than generating an individual monitoring process for every different user that wishes to monitor an event, the present system uses one monitoring process for an event and controls how to apply the same monitoring process to each user by leveraging a trust relationship between computers/components of the enterprise computing environment. This reduces the number of different monitoring processes that have to be generated, maintained, and executed, which reduces computing resources. In this way, a single monitoring process can be constructed and executed for event notification and can be applied to a group of users (e.g. called subscribers herein). Thus, separate monitoring processes do not need to be individually constructed, stored, and executed for each subscriber. The present system reduces the number of executing processes and thus reduces consumption of system resources (e.g., processor time, memory, network bandwidth, etc.). This helps the overall computing system operate more efficiently and provide faster response times.

Figure 1:
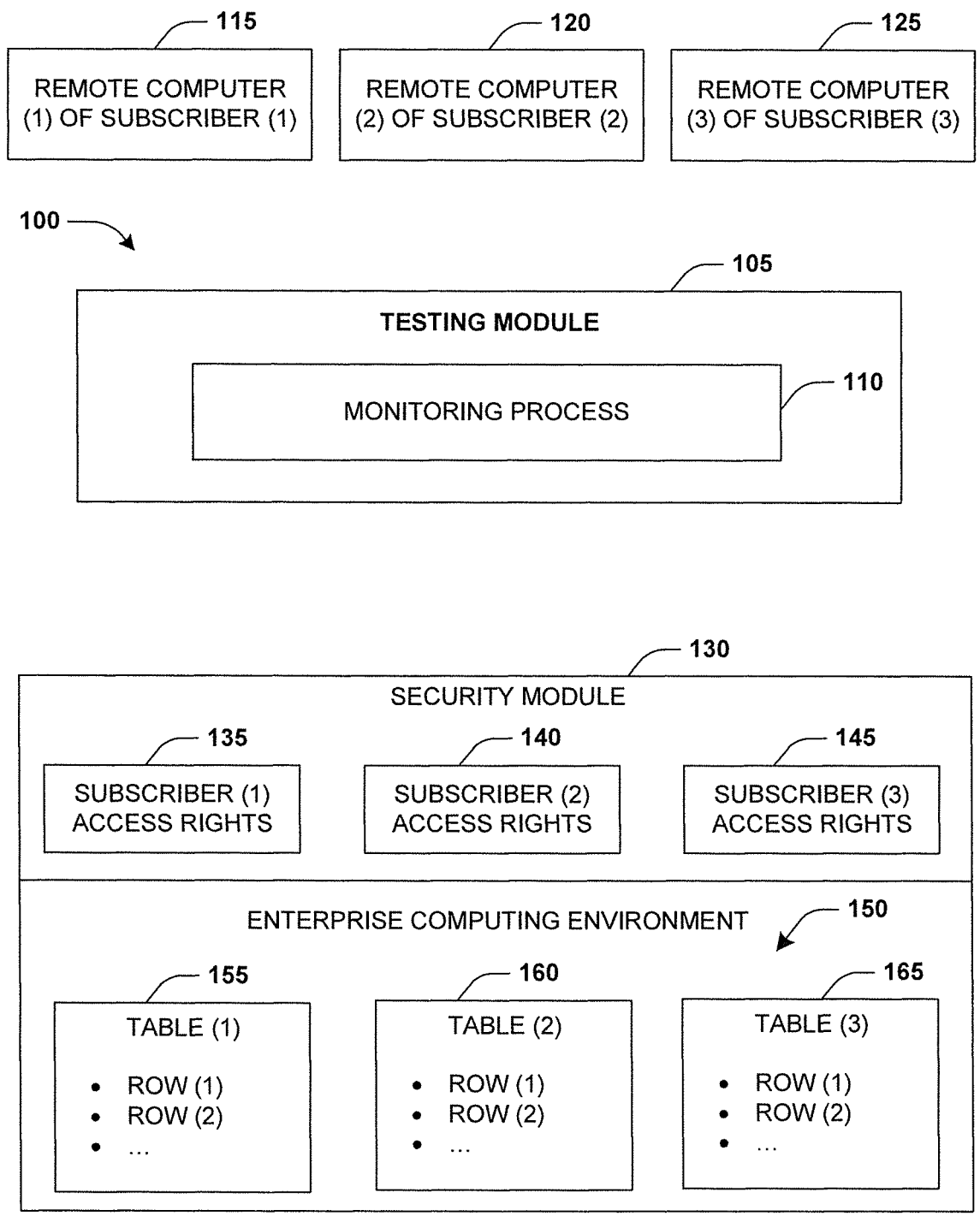
FIG. 1 illustrates an embodiment of a system associated with a monitoring process for event detection.
Figure 2:
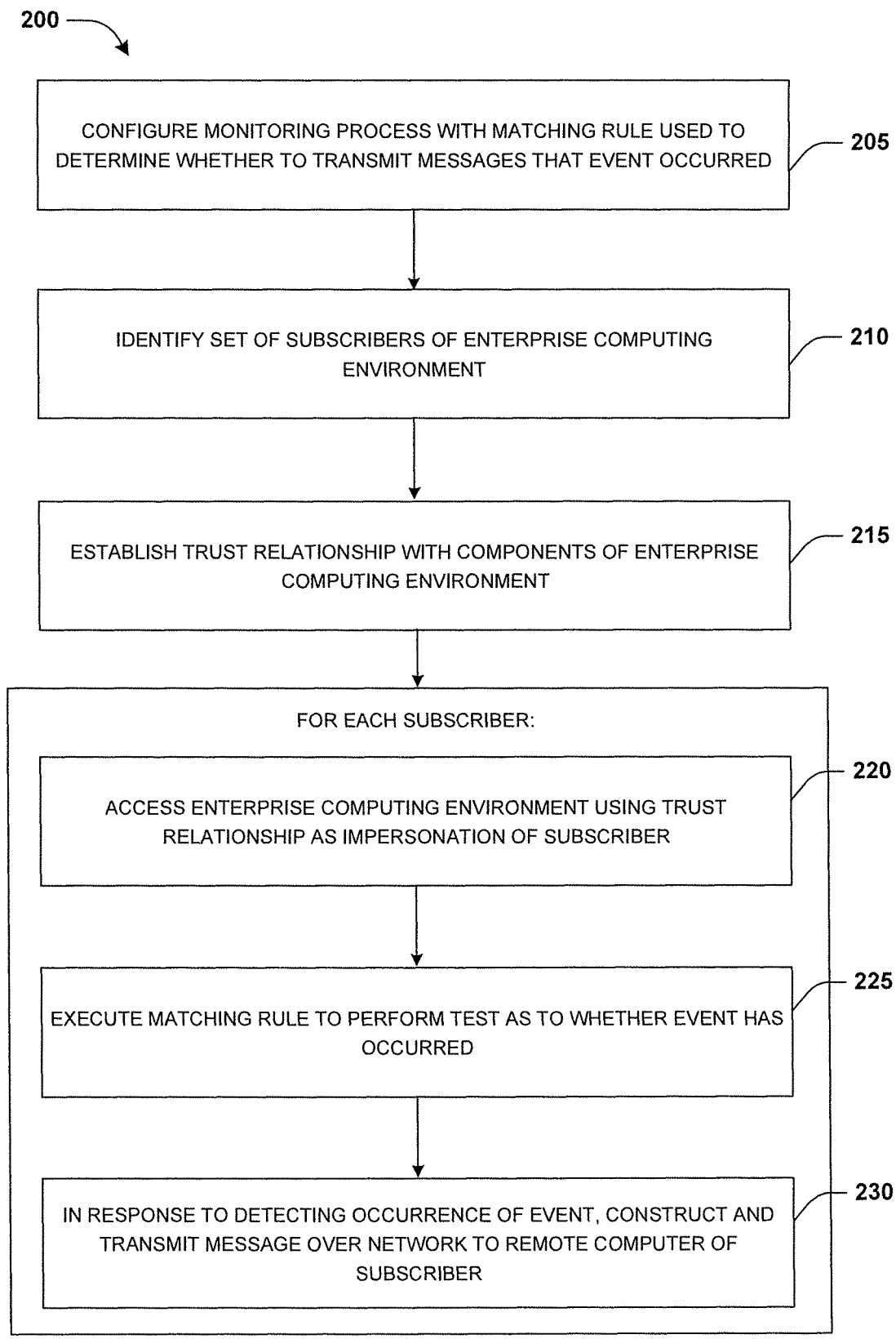
FIG. 2 illustrates an embodiment of a method associated with a monitoring process for event detection.

With reference to FIG. 1, one embodiment of a system 100 associated with a monitoring process for event detection is illustrated and summarized, and a more detailed description is provided with reference to FIG. 2. The system 100 is implemented as a testing module 105 hosted on a computing device, such as a computer 515 of FIG. 5. The testing module 105 is configured for detecting occurrences of events and transmitting notifications of such occurrences by determining whether data hosted by an enterprise computing environment 150 matches criteria of a matching rule. The criteria can comprise a threshold criteria, such as where a lease expiration date is less than 10 days from a current date, thus indicative of an upcoming lease expiration event. The criteria can comprise a value criteria, such as where a purchase order received field is set to a true value, thus indicative of a purchase order receipt event. The criteria can comprise equations, business logic, or other process commands used to evaluate data to determine whether an event has occurred.

In one embodiment, the single monitoring process is defined and executed for monitoring the occurrence of a defined event or condition (e.g., event 1). There may be a multiple number of users (e.g., subscribers) in the computing system that are interested in being notified when the event occurs. In one example, the event may be an event that is monitored across multiple system components, resources, or data structures. Thus, rather than executing separate processes that monitor the same event on each different system component/resource, the present system consolidates the monitoring into one process for the same event and applies the monitoring process across all the applicable system components, resources, or data structures. This reduces the number of executing processes since one process can monitor for event 1 in multiple servers simultaneously (e.g., server 1, server 2, and server 3) rather than executing three different processes that each monitor for event 1 on each server separately.

However, information relating to each server may be restricted to only authorized users. Suppose in the example that user 1, user 2, and user 3 are subscribers to event 1, meaning that users 1-3 are designated to receive notifications regarding event 1. If only user 1 has security credentials to results of the event occurring in server 1, then user 2 and user 3 should not receive a notice of event 1 when the event occurs on server 1. This is a security issue when using a consolidated single monitoring process because the monitoring process cannot automatically transmit notifications to every user associated with event 1. Accordingly, the present system controls the monitoring process and notification function by establishing a trust relationship with the system components of the enterprise computing environment where the event occurred (in this example, server 1). This is implemented as an impersonation function.

Using the trust relationship, the system attempts to access the server 1 by impersonating each user. If the access is successful for a user, then the system determines that the associated user is authorized to receive a notification of the event regarding server 1 and transmits a notice. If the access is not successful for a user, then the system determines that the associated user is not authorized to receive the notification of the event, and the process continues to the next user, if any. In this manner, the present system leverages the trust relationship to control who is permitted to receive a notice and who is prohibited from receiving a notice based on the system component/resource being monitored.

This single monitoring process can be executed for each subscriber to determine whether data accessible to a subscriber indicates that an event occurred and that a message should be constructed and transmitted to that subscriber. In particular, the monitor process creates a trust relationship with the enterprise computing environment. For each subscriber, the monitoring process can use the trust relationship to access the enterprise computing environment as an impersonation of the subscriber. In this way, the monitoring process will have permission to access only those data sources for which a security module provides the subscriber with authorization to access.

While impersonating the subscriber, the monitoring process executes the matching rule upon data of those data sources accessible to the subscriber to perform a test as to whether the event has occurred. If the event has occurred with respect to the data of that subscriber, then a message of the event is transmitted over a network to a remote computer of that subscriber. Otherwise, no message is transmitted to the subscriber. After, the monitoring process logs out from impersonating the subscriber, and logs into the enterprise computing environment as an impersonation of the next subscriber. Because different subscribers have access to different data sources, some subscribers may receive messages while other subscribers may not receive messages based upon whether data accessible to respective subscribers is indicative of the event.

Accordingly, the testing module 105 configures a monitoring process 110 with the matching rule. The matching rule is used to evaluate data of data sources within the enterprise computing environment 150, such as values populated within rows of a first table 155, a second table 160, a third table 165, and/or other types of data sources, to determine whether such data matches the criteria of the matching rule. The testing module 105 is configured to construct and transmit messages over a network to remote computers of subscribers of the enterprise computing environment 150 to indicate that the event occurred, such as to a first remote computer 115 of a first subscriber, a second remote computer 120 of a second subscriber, a third remote computer 125 of a third subscriber, etc.

Because a single monitoring process 110 is defined and executed by the testing module 105 for a plurality of subscribers, the testing module 105 is configured to access the enterprise computing environment 150 as impersonations of each subscriber in order to determine whether data of each subscriber matches the criteria of the matching rule. Because different subscribers have access to different data sources, impersonating each subscriber allows the testing module 105 to test for whether the event occurred with respect to data of each individual subscriber based upon the data sources that the testing module 105 has permission to access while impersonating each individual subscriber. For example, when determining if a low inventory event has occurred, certain subscribers may be in charge of different warehouses (e.g., regional managers that oversee different regions of warehouses). Thus each subscriber may only have access rights to data sources populated with inventory data for those warehouses that each subscriber oversees.

A security module 130, associated with the enterprise computing environment 150, is configured to control what data sources subscribers are allowed to access within the enterprise computing environment 150, such as based upon user roles and/or access permissions. In one embodiment, the security module 130 controls the first subscriber's access to data using first subscriber access rights 135, such as where the first subscriber is only allowed to access rows of the first table 155. The security module 130 controls the second subscriber's access to data using second subscriber access rights 140, such as where the second subscriber is only allowed to access rows of the second table 160. The security module 130 controls the third subscriber's access to data using third subscriber access rights 145, such as where the third subscriber is only allowed to access rows of the third table 165. In this way, when a subscriber uses a remote computer to log into the enterprise computing environment 150, the security module 130 controls access to data sources using access rights defined for the subscriber.

The testing module 105 leverages the trust relationship in order to execute the matching rule for each subscriber upon data sources accessible to each individual subscriber to determine whether the event occurred with respect to data accessible to individual subscribers. In particular, the testing module 105 executes the monitoring process to identify a set of subscribers of the enterprise computing environment 150. The testing module 105 creates the trust environment with servers of the enterprise computing environment 150 and/or the security module 130 so that the testing module 105 can iteratively access the enterprise computing environment 150 as impersonations of each subscriber to determine whether data within data sources made accessible to respective subscribers is indicative of the event occurring.

For each subscriber, the monitoring process 110 accesses the enterprise computing environment 150 as an impersonation of the subscriber for remote access from a computer executing the monitoring process 110 to data sources for which the subscriber is authorized to access by the security module 130. The monitoring process 110 impersonates the subscriber by asserting to the security module 130 and/or the enterprise computing environment 150 that the monitoring process 110 is the subscriber even though the monitoring process 110 is computer executable code executing on the computer and not the subscriber attempting to access the enterprise computing environment 150 from a remote computer.

While accessing the enterprise computing environment 150 using the trust relationship and impersonating the particular subscriber, the monitoring process 110 executes the matching rule to perform a test as to whether the event being monitored for has occurred. The matching rule determines whether the event has occurred by extracting data from the data sources available to the subscriber, and determining whether the data matches the criteria of the matching rule, such as matching a value, exceeding a threshold, producing a certain output when processed using business logic, etc. If the test detects the occurrence of the event, then the monitoring process 110 constructs and transmits a message over a network to a remote computer of the particular subscriber to indicate that the event occurred with respect to data accessible to that particular subscriber. After, the monitoring process 110 logs out from the subscriber's account and logs into the enterprise computing environment 150 as an impersonation of the next subscriber to determine whether the event occurred for the next subscriber.

In this way, the monitoring process 110 iteratively impersonates each subscriber and evaluates data of data sources available to each subscriber to determine if the event occurred with respect to the data of each subscriber. Because different data sources are available to different subscribers, some subscribers may receive messages that their data indicated that the event occurred while other subscribers may receive no message because their data indicated that the event did not occur. Also, different messages may be sent to different subscribers based upon differences in their data. For example, the first subscriber may be provided with a message that 10 leases are expiring within the next 10 days based upon the particular data within the first table 155 made accessible to the first subscriber by the security module 130 using the first subscriber access rights 135. The second subscriber may be provided with a message that 2 leases are expiring within the next 10 days based upon the particular data within the second table 160 made accessible to the second subscriber by the security module 130 using the second subscriber access rights 140. No messages may be provided to the third subscriber based upon the particular data within the third table 165 made accessible to the third subscriber by the security module 130 using the third subscriber access rights 145.

With reference to FIG. 2, one embodiment of a computer implemented method 200 associated with a monitoring process for event detection is illustrated. In one embodiment, the method 200 is performed by the testing module 105 and system 300 of FIGS. 3A-3C utilizing various computing resources of the computer 515 of FIG. 5 or other computers. The computing resources, such as the processor 520, are used for executing instructions associated with configuring and executing a monitoring process 310. Memory 535 and/or disks 555 are used for storing the monitoring process, and/or other data. Network hardware is used for transmitting messages of event notifications between the computer 515 and remote computers over a network. The method 200 is triggered upon execution of an application on the computer 515 implementing the testing module 105 to test for the occurrence of events, such as based upon an execution schedule, a periodic execution, a user requested execution, etc.

Rather than generating an individual monitoring process for every different user that wishes to monitor an event, the present method uses one monitoring process for an event and controls how to apply the same monitoring process to each user by leveraging already defined data access for each user. This reduces the number of different monitoring processes that have to be generated, maintained, and executed, which reduces computing resources. In this way, a single monitoring process can be constructed and executed for event notification and can be applied to a group of users (e.g. called subscribers herein). Thus, separate monitoring processes do not need to be individually constructed, stored, and executed for each subscriber. The present system reduces the number of executing processes and thus reduces consumption of system resources (e.g., processor time, memory, network bandwidth, etc.). This helps the overall computing system operate more efficiently and provide faster response times.

At 205, the monitoring process 310 is configured by the testing module 105 with a matching rule used to evaluate data within data sources of an enterprise computing environment 350 to determine whether to transmit messages to remote computers of subscribers of the enterprise computing environment 350 that an event occurred. In one embodiment, the matching rule is defined with a value criterion used to determine whether an event occurred. For example, the matching rule determines whether available storage of storage devices is equal to a 0 value criterion, thus indicating an out of storage event. In another embodiment, the matching rule is defined with a threshold criterion to determine whether an event occurred. For example, the matching rule determines whether cloud storage device leases will expire within a 10 day threshold criterion, thus indicating a lease expiration event. In another embodiment, the matching rule is defined with business logic to determine whether an event occurred. For example, the matching rule executes the computer logic to determine whether there is a price or quantity discrepancy between purchase orders and receipts, thus indicating a discrepancy event. In this way, a variety of different criteria can be defined for the matching rule to detect any type of event.

The testing module 105 executes the monitoring process 310 to determine whether the event occurred with respect to data accessible to respective subscribers of the enterprise computing environment 350. At 210, the monitoring process 310 identifies a set of subscribers of the enterprise computing environment 350. In one embodiment, the set of subscribers are subscribers that requested to be notified of when the event occurred. Such subscribers may subscribe through a user interface of the enterprise computing environment 350 to have the monitoring process 310 monitor for occurrences of the event with respect to each subscriber. In another embodiment, the monitoring process 310 specifies a group or type of subscriber for which the event is to be monitored, such as subscribers having an inventory management role for a business. The monitoring process 310 can query the enterprise computing environment 350 for a list of such subscribers that are assigned to having the inventory management role.

In one embodiment of identifying the set of subscribers, the monitoring process 310 is defined to monitor for low storage events where available storage of storage devices is below a threshold criterion, such as 15%. The monitoring process 310 is defined to monitor for the event on behalf of subscribers having a data warehouse management role for the business. Accordingly, the monitoring process 310 queries the enterprise computing environment 350 to obtain a list of subscribers having the data warehouse management role, such as a first subscriber associated with a first remote computer 315, a second subscriber associated with a second remote computer 320, and a third subscriber associated with a third remote computer 325.

The first subscriber may have a data warehouse management role for a first region of data warehouses, the second subscriber may have a data warehouse management role for a second region of data warehouses, and the third subscriber may have a data warehouse management role for a third region of data warehouses. Date warehouse storage data for each region may be stored in different data sources of the enterprise computing environment 350, and thus each subscriber may have access to different data sources. In one embodiment, a security module 330 for the enterprise computing environment 350 maintains and enforces first subscriber access rights 335 specifying that the first subscriber can access a second row within a first table 355 and a first row in a second table 360 having first region inventory data, but is not allowed to access other rows or tables. The security module 330 maintains and enforces second subscriber access rights 340 specifying that the second subscriber can access a first row within the second table 360 having second region inventory data, but is not allowed to access other rows or tables. The security module 330 maintains and enforces third subscriber access rights 345 specifying that the third subscriber can access a first row and a third row within a third table 365 having third region inventory data, but is not allowed to access other rows or tables.

At 215, the monitoring process 310 establishes a trust relationship with servers of the enterprise computing environment 350 and/or the security module 330. In one embodiment, the monitoring process 310 is configured with a level of access to the enterprise computing environment 350 based upon the trust relationship that allows the monitoring process 310 to access data sources for which each user is authorized. In another embodiment, the set of subscribers may have explicitly subscribed through a user interface of the enterprise computing environment 350 to have the monitoring process 310 execute as impersonations of them on their behalf.

In one embodiment, the trust relationship is created between a first server running the monitoring process 310 and servers used for authentication, such as for HTML and security (e.g., a computer hosting the security module 330). Public and private key certificates are configured between the first server and the servers as part of the trust relationship. When the first server uses the private key to generate a token that includes a subscriber name or other identifier, a server such as an HTML server can validate the token with the public key. If the token is valid, then the HTML server will trust the requestor and create a session for the subscriber from the request. In this way, the monitoring process impersonates the subscriber. There is also an additional level of trust between servers such as between the HTML server and a security server, which is referred to a trust node. The trust node may comprise a proprietary type of trust, such as a JDE proprietary type of trust, configured in a database of the enterprise computing environment 350.

In another embodiment, the trust relationship is established between a server, an HTML server, and a security server. The private key certificate is configured at the server, which is used for token generation. The public key certificate is configured at the HTML server, which is used for token validation. The public key certificate may be stored in a secure Java keystore and uploaded to the HTML server. The HTML server may be configured as a trusted node via a single sign on (SSO) trust configuration. Accordingly, the server generates a token, such as a JWT token, for each subscriber with each subscriber's user ID. The server transmits a token to the HTML server to establish a session. The token is validated against the public key certificate by the HTML server. Token timeout is validated and a subscriber identifier is extracted. A PS token is generated for the user and sent from the HTML server to the security server for authorization. The security server checks the PS token with signal sign on (SSO) node trust. An authorization response is returned to the HTML server, and is returned from the HTML server to the server. The authorization response comprises the PS token. The server can use the subscriber's session to execute the monitoring process 310, and then logs out.

Figure 3A:
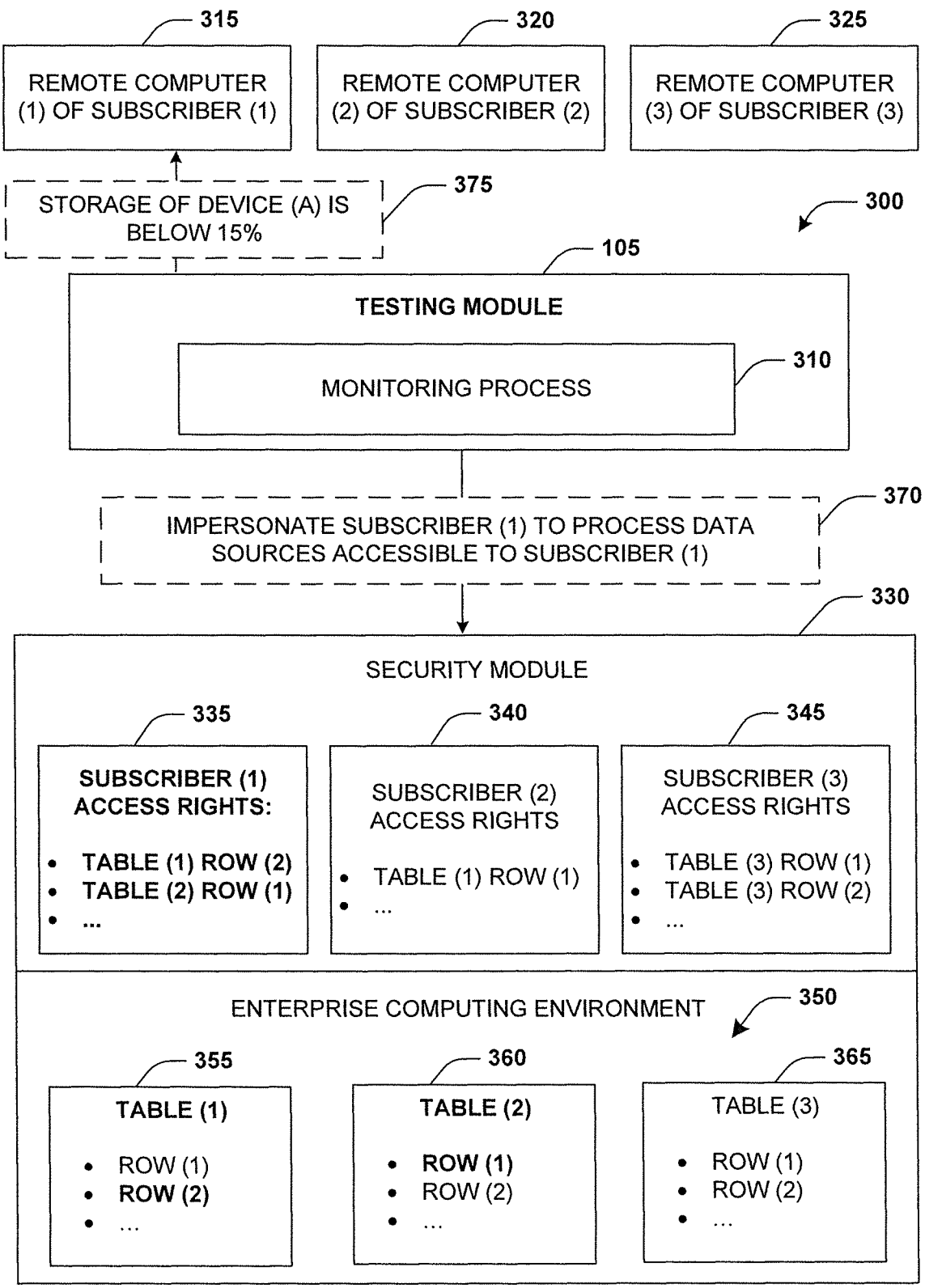
FIG. 3A illustrates an embodiment of a system associated with a monitoring process for event detection, where an event is detected.

At 220, for the first subscriber, the monitoring process 310 accesses 370 the enterprise computing environment 350 as an impersonation of the first subscriber using the trust relationship, as illustrated by FIG. 3A. The monitoring process 310 asserts the trust relationship to the enterprise computing environment 350 in order to gain remote network access to the data sources for which the first subscriber is authorized to access by the security module 330. In particular, the monitoring process 310 gains access rights to the second row of the first table 355 and the first row of the second table 360 based upon the security module 330 enforcing the first subscriber access rights 335 for the impersonation of the first subscriber by the monitoring process 310. The monitoring process 310 impersonates the first subscriber using the trust relationship by creating a trusted connection with the enterprise computing environment 350 using a JSON Web Token. The JSON Web Token is an access token that asserts that an entity using the JSON Web Token, such as the monitoring process 310, is the first subscriber. Thus, the JSON Web Token can be used by the monitoring process 310 so assert that the monitoring process 310 is the first subscriber even though the monitoring process 310 is not the first subscriber.

At 225, the monitoring process 310 executes the matching rule to perform a test as to whether the event being monitored for has occurred with respect to data accessible to the first subscriber. In one embodiment, the monitoring process 310 identifies which data sources, such as table and rows, the first subscriber is given authorization by the security module 330 to access. For example, the monitoring process 310 may query the security module 330 to determine that the first subscriber access rights 335 allow the first subscriber to access data within the second row of the first table 355 and the first row of the second table 360. The data sources are identified because different subscribers may have access to different data sources. For example, for a given subscriber, the security module 330 is queried to determine that the subscriber has access to a subset of rows and tables maintained by the enterprise computing environment 350 based upon a user role of the subscriber and access permissions of the subscriber.

Once the data sources are identified, the matching rule is executed to query the second row of the first table 355 and the first row of the second table 360 for inventory level data because the first subscriber is authorized by the security module 330 to access those rows. The rows are queried to identify and compare any available storage level data within those rows against the 15% threshold criteria of the matching rule. In one embodiment, the query is executed as a proxy of the first subscriber upon the data sources for which the first subscriber has authorization to access to extract the data used to perform the test. In one embodiment, storage level data for a storage device (A) of the first region managed by the first subscriber is compared with the 15% threshold criteria to determine that a storage level within the storage device (A) is below the 15% threshold criteria. In this way, the test determines that a low storage event has occurred.

Various types of matching rules may be executed against data sources to determine if events have occurred. In one embodiment of a matching rule, the matching rule is configured with a criterion such as a date criterion or a date threshold criterion. If date information within data sources accessible to a subscriber match the date criterion or exceed the date threshold criterion, then an occurrence of an event may be detected, such as where a date of a product release matches a current date and thus is indicative of a product release event. Accordingly, the matching rule is executed to extract date information from the data sources, such as a row within a table of product release information. The matching rule performs a test to compare the extracted date information with the criterion to determine whether the event occurred respect to the subscriber.

In another embodiment of a matching rule, the matching rule is configured with a criterion such as a value criterion or a value threshold criterion. If purchase order information (or any other information such as receipt information) within data sources accessible to a subscriber match the value criterion or exceed the value threshold criterion, then an occurrence of an event may be detected, such as where a purchase order has a price value exceeding a threshold thus indicting a user review trigger event. Accordingly, the matching rule is executed to extract purchase order information from the data sources, such as a row within a table of purchase order data. The matching rule performs a test to compare the extracted purchase order information with the criterion to determine whether the event occurred with respect to the subscriber.

In another embodiment of a matching rule, the matching rule is configured with a criterion such as an inventory level criterion or an inventory level threshold criterion. If inventory information within data sources accessible to a subscriber match the inventory level criterion or exceed the inventory level threshold criterion, then an occurrence of an event may be detected, such as where inventory of a product has value less than 10 thus indicting a low inventory event. Accordingly, the matching rule is executed to extract inventory information from the data sources, such as a row within a table of inventory data. The matching rule performs a test to compare the extracted inventory information with the criterion to determine whether the event occurred respect to the subscriber.

In another embodiment, different or customized criteria can be used for each subscriber or subsets of subscribers. For example, the first subscriber may specify a 15% storage level threshold criterion. The second subscriber may specify a 10% storage level threshold criterion. The third subscriber may specify a 10 unit criterion. In this way, the criterion used by the matching rule can be customized per subscriber or a default criterion can be used where there is no specified customization.

At 230, in response to the test detecting an occurrence of the event with respect to data accessible to the first subscriber, the monitoring process 310 constructs a message 375 to indicate that the event occurred. The message 375 may be tailored to the particular occurrence of the event. For example, the message 375 is construct to indicate that the available storage of the storage device (A) is below the 15% threshold criteria. The monitoring process 310 transmits the message 375 over a network to the first remote computer 315 of the first subscriber for rendering on a display of the first remote computer 315. In response to transmitting the message 375 to the first remote computer 315, the monitoring process 310 logs out as the impersonation of the first subscriber from the enterprise computing environment 350.

Figure 3B:
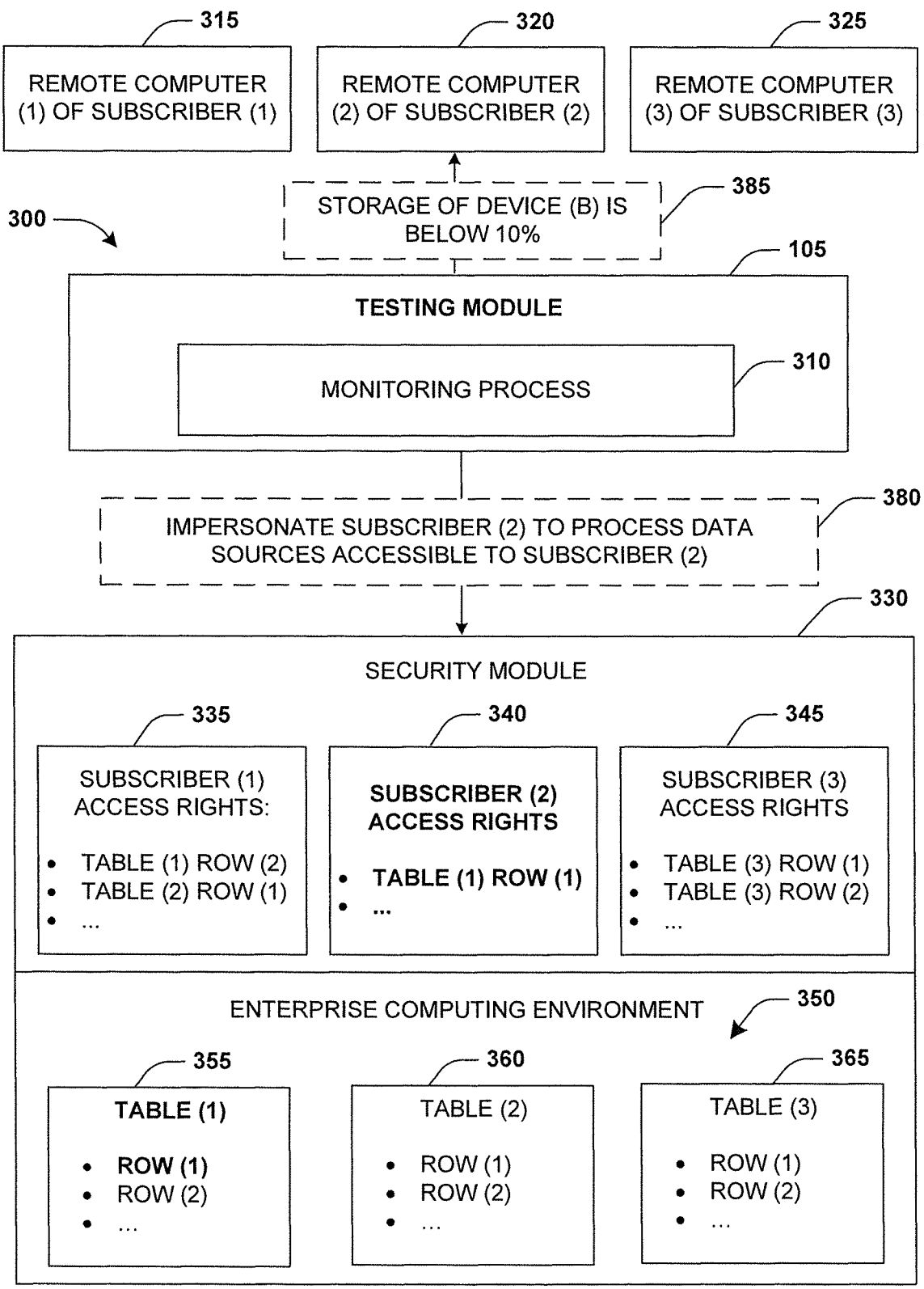
FIG. 3B illustrates an embodiment of a system associated with a monitoring process for event detection, where an event is detected.

Once the monitoring process 310 has either transmitted the message 375 based upon detecting the event or refrained from constructing and transmitting the message 375 based upon not detecting the event, the monitoring process 310 logs out as the first subscriber. The monitoring process 310 then accesses 380 the enterprise computing environment 350 as an impersonation of the second subscriber using the trust relationship, as illustrated by FIG. 3B. The monitoring process 310 determines that the second subscriber has access to the first row of the first table 355, such as by evaluating through the security module 330 the second subscriber access rights 340.

Upon identifying the data sources available to the second subscriber, the monitoring process 310 extracts information from the first row of the first table 355. The monitoring process 310 executes the matching rule to perform a test as to whether the event has occurred based upon the extracted data matching the criteria of the matching rule, such as the 10% storage level threshold criterion specified by the second subscriber. In response to the test determining that a low storage event occurred based upon the extracted data indicating available storage of a storage device (B) of the second region is below the 10% storage level threshold criterion, the monitoring process 310 constructs a message 385. The message 385 indicates that the available storage of the storage device (B) is the 10% storage level threshold criterion. The message 385 is transmitted over the network to the second remote computer 320 of the second subscriber. In this way, different types of customized messages can be constructed and transmitted. The monitoring process 310 then logs out from the enterprise computing environment 350 as the impersonation of the second subscriber.

Figure 3C:
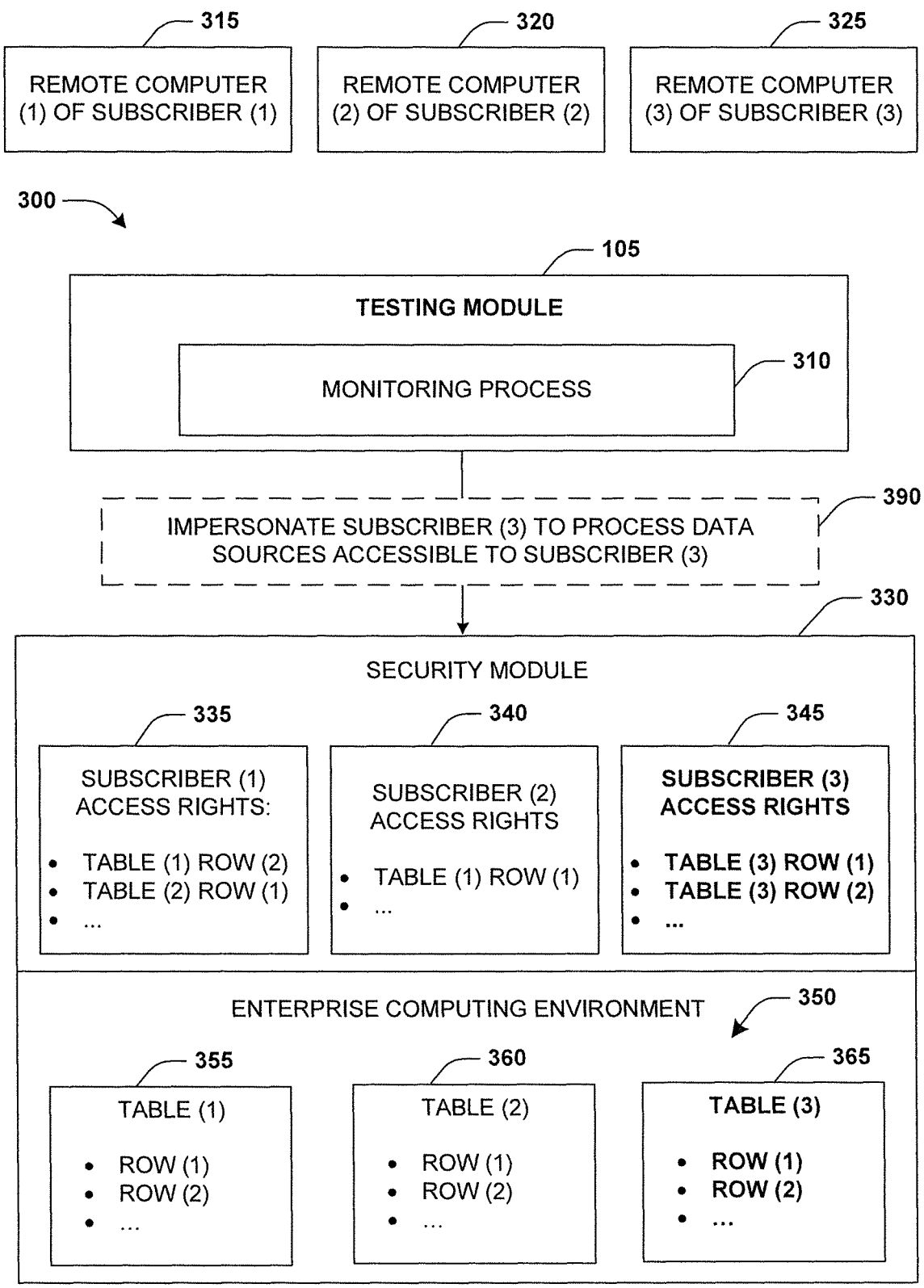
FIG. 3C illustrates an embodiment of a system associated with a monitoring process for event detection, where no event is detected.

Once the monitoring process 310 has either transmitted the message 385 based upon detecting the event or refrained from constructing and transmitting the message 385 based upon not detecting the event, the monitoring process 310 logs out as the second subscriber. The monitoring process 310 then accesses 390 the enterprise computing environment 350 as an impersonation of the third subscriber using the trust relationship, as illustrated by FIG. 3C. The monitoring process 310 determines that the third subscriber has access to the first and second rows of the third table 365, such as by evaluating through the security module 330 the third subscriber access rights 345.

Upon identifying the data sources available to the third subscriber, the monitoring process 310 extracts information from the first and second rows of the third table 365. The monitoring process 310 executes the matching rule to perform a test as to whether the event has occurred based upon the extracted data matching the criteria of the matching rule, such as the 10 unit criterion specified by the third subscriber. In response to the test determining that the low storage event has not occurred based upon the extracted data indicating available storage of a storage device (C) of the third region has more than 10 units of storage, the monitoring process 310 refrains from constructing and transmitting a message to the third remote computer 325. The monitoring process 310 then logs out from the enterprise computing environment 350 as the impersonation of the third subscriber.

In another embodiment, a monitoring process is defined to monitor for an occurrence of an event. A plurality of users are assigned to the monitoring process. The monitoring process is executed to monitor for the event on each of a plurality of computing components. In response to the event being detected on one of the components of the plurality of components, a notification of the event is generated. An authorization is performed by impersonating each selected user of the plurality of users by establishing a trust relationship with the plurality of computing components via a network access. The notification is transmitted to a device associated with a selected user. In response to the authorization being unsuccessful for the selected user (e.g., the user does not have access rights to the component from which the event was detected), the transmission of the notification is bypassed.

Figure 4:
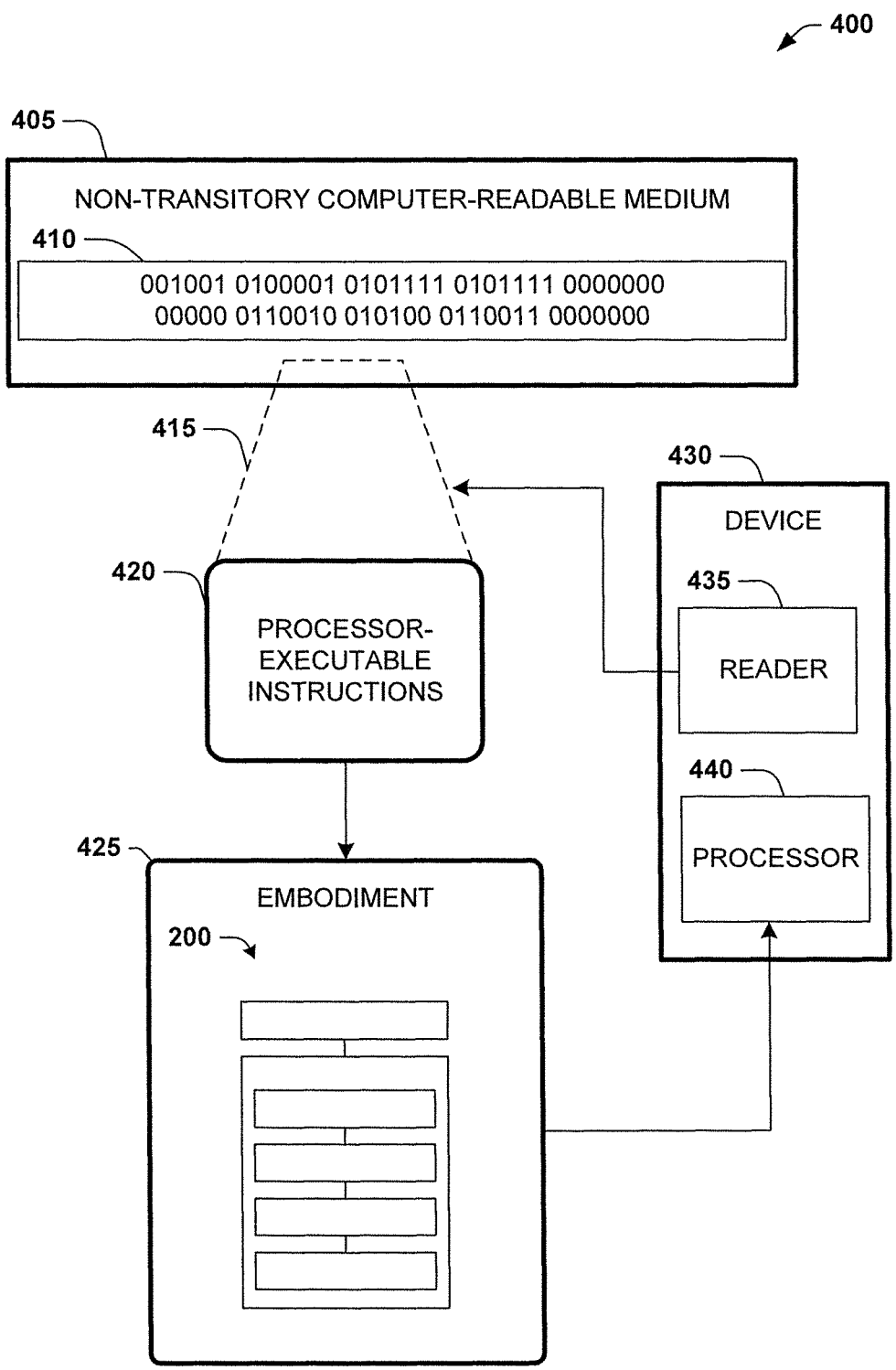
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the testing module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the, functionality of the testing module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
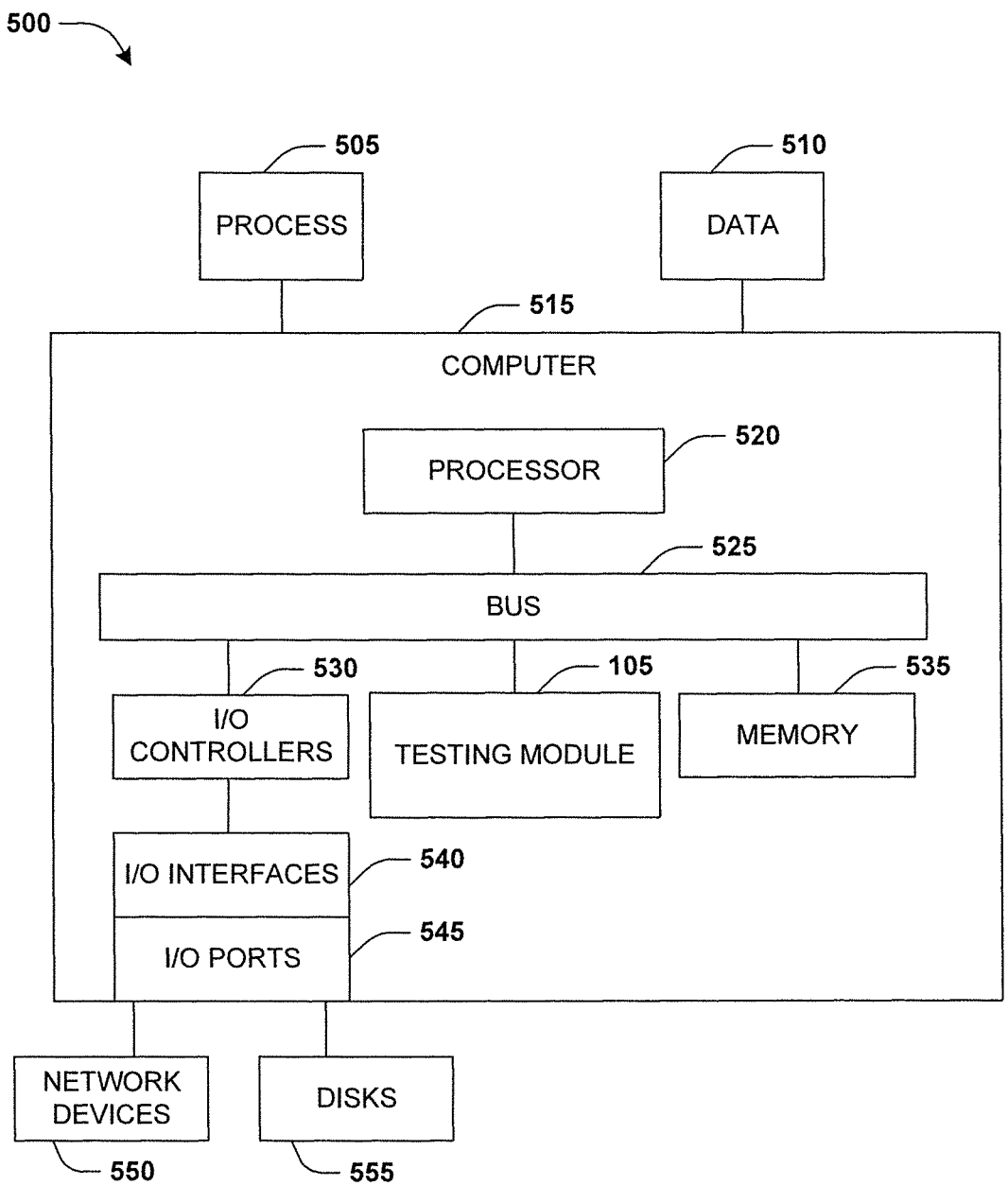
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the, the computer 515 may include logic of the testing module 105 configured to facilitate the system 100 and/or the method 200 shown in FIGS. 1-2. In different embodiments, the logic of the testing module 105 may be implemented in hardware, a non-transitory computer-readable medium 505 with stored instructions, firmware, and/or combinations thereof. While the logic of the testing module 105 is illustrated as a hardware component attached to the bus 525, it is to be appreciated that in other embodiments, the logic of the testing module 105 could be implemented in the processor 520, stored in memory 535, or stored in disk 555.

In one embodiment, logic of the testing module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the testing module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multi-processor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
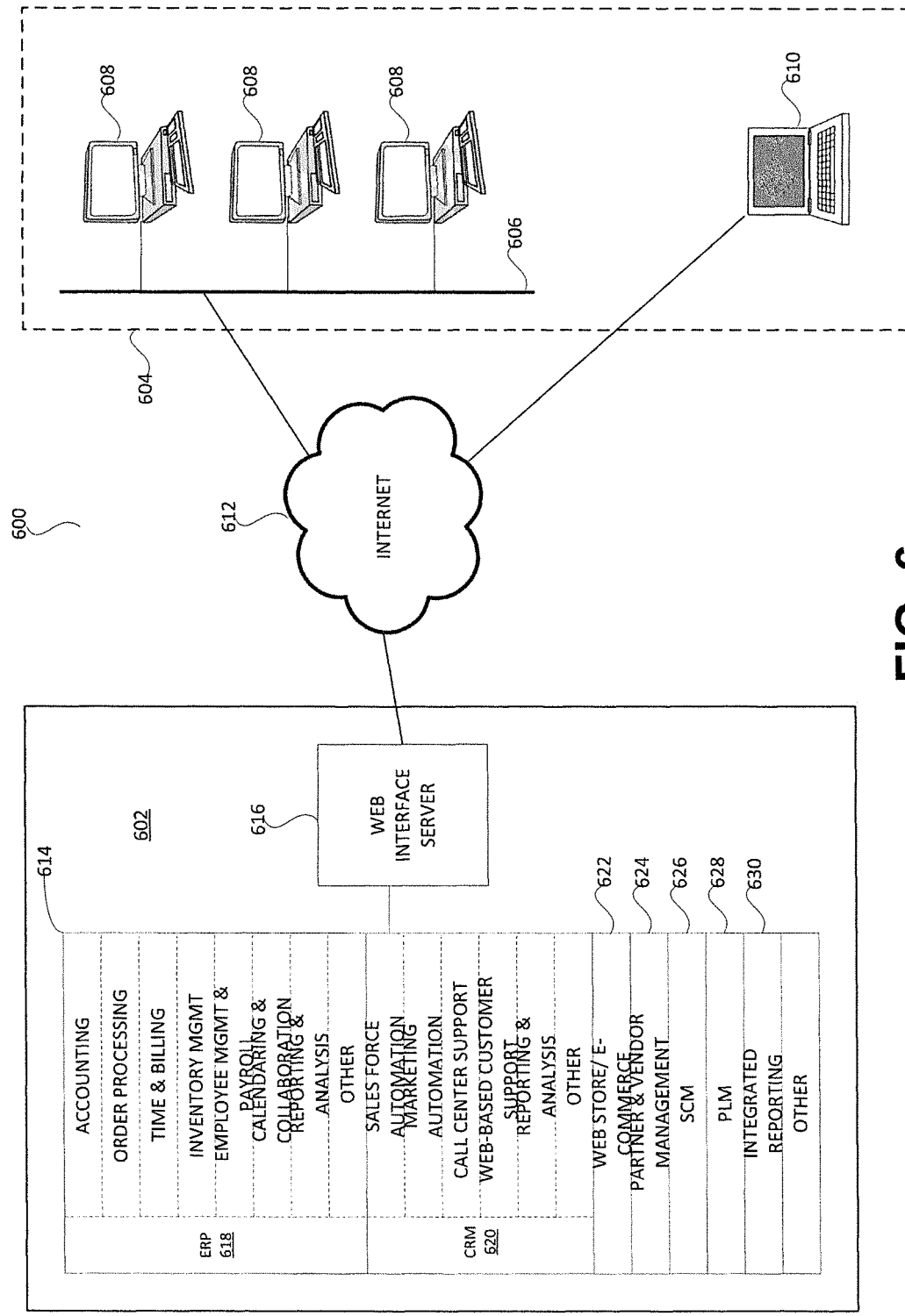
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
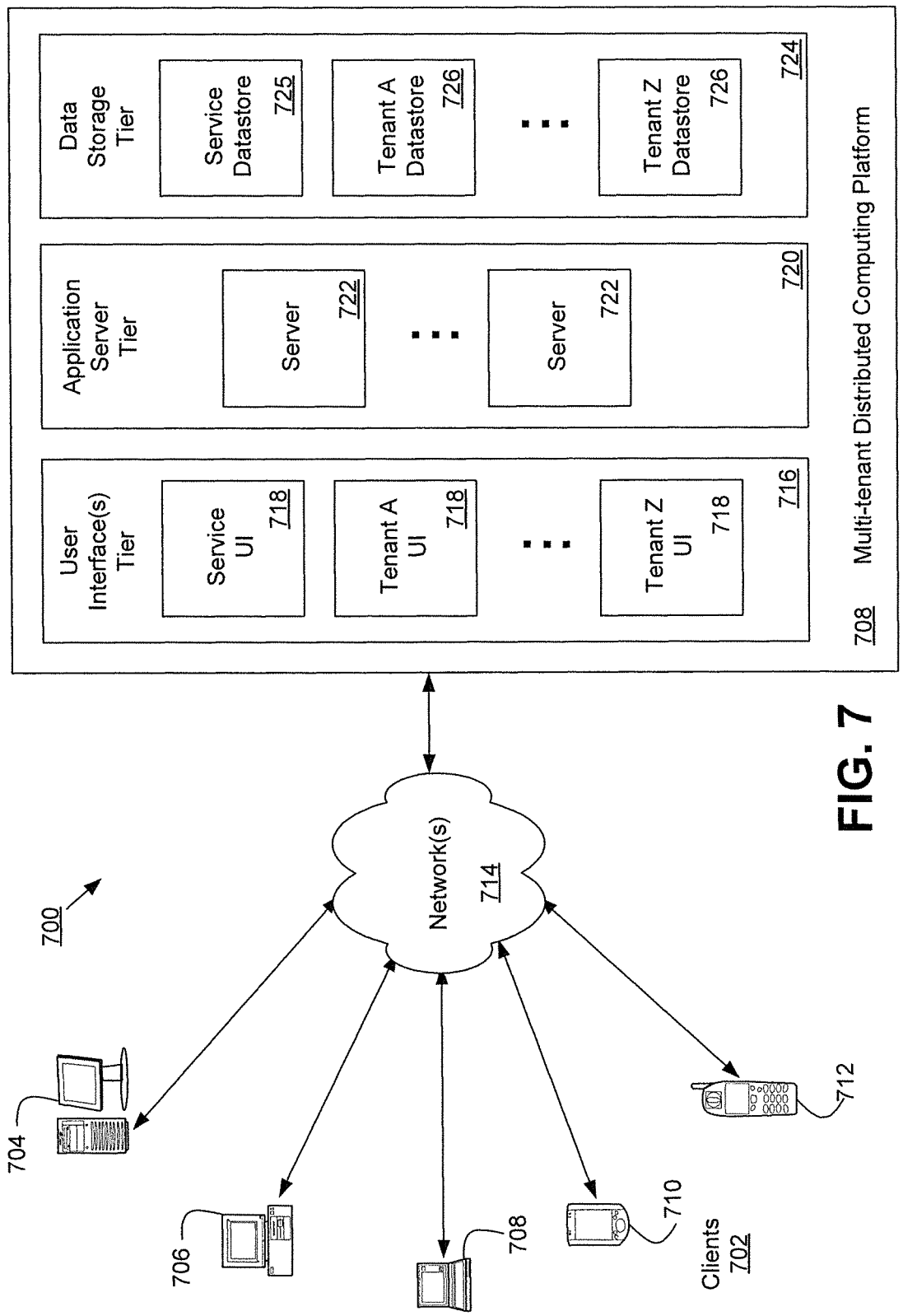
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device causes the processor to:
    configure a monitoring process with a matching rule used to determine whether an event has occurred; and
    execute, by the processor, the monitoring process to:
    identify a set of subscribers of an enterprise computing environment;
    establish a trust relationship with components of the enterprise computing environment, wherein the trust relationship is established for monitoring for the event by the monitoring process as impersonations of the set of subscribers; and
    for each subscriber:
    access the enterprise computing environment, by the processor, using the trust relationship as an impersonation of a subscriber, wherein the monitoring process obtains access to data sources for which the subscriber is authorized to access while impersonating the subscriber based upon the trust relationship;
    execute the matching rule to perform a test as to whether the event being monitored has occurred based upon the matching rule determining that data of the data sources matches criteria of the matching rule;
    in response to the test detecting an occurrence of the event, generate and transmit a message over a network to a remote computer of the subscriber to indicate that the event has occurred; and
    in response to not detecting the event, refraining from generating and transmitting the notification and not establishing the impersonation of the subscriber.

2. The non-transitory computer-readable medium of claim 1, wherein the instructions comprise instructions to:
    create, by the processor, a trusted connection with the enterprise computing environment using a Web Token to impersonate the subscriber, wherein the Web Token is an access token that asserts that an entity using the Web Token is the subscriber.

3. The non-transitory computer-readable medium of claim 1, wherein the instructions comprise instructions to:
    for each of the subscribers:
    identify data sources for which a given subscriber is authorized to access; and
    execute the matching rule upon the data sources for which the given subscribed is authorized to access.

4. The non-transitory computer-readable medium of claim 1, wherein data sources accessible to each subscriber are different data sources.

5. The non-transitory computer-readable medium of claim 1, wherein the instructions comprise instructions to:
construct and transmit different messages for each subscriber with information tailored to how data within data sources accessible to each subscriber matched the criteria of the matching rule.

6. The non-transitory computer-readable medium of claim 1, wherein the instructions to execute the matching rule comprise instructions to:
extract date information from a row within a table for which the subscriber has authorization to access; and
perform the test to determine whether the date information matches a date criterion or exceeds a date threshold criterion of the matching rule to determine whether the event has occurred.

7. The non-transitory computer-readable medium of claim 1, wherein the instructions to execute the matching rule comprise instructions to:
extract purchase order information from a row within a table for which the subscriber has authorization to access; and
perform the test to determine whether the purchase order information matches a value criterion or exceeds a value threshold criterion of the matching rule to determine whether the event has occurred.

8. The non-transitory computer-readable medium of claim 1, wherein the instructions to execute the matching rule comprise instructions to:
extract inventory information from a row within a table for which the subscriber has authorization to access; and
perform the test to determine whether the inventory information matches an inventory level criterion or exceeds an inventory level threshold criterion of the matching rule to determine whether the event has occurred.

9. A computing system, comprising:
a processor connected to memory; and
a testing module stored on a non-transitory computer readable medium and configured with instructions that when executed by the processor cause the processor to:
configure a monitoring process with a matching rule used to determine whether an event has occurred; and
execute, by the processor, the monitoring process to:
identify a set of subscribers of an enterprise computing environment;
establish a trust relationship with components of the enterprise computing environment, wherein the trust relationship is established for monitoring for the event by the monitoring process as impersonations of the set of subscribers; and
for each subscriber:
access the enterprise computing environment using the trust relationship as an impersonation of a subscriber, wherein the monitoring process obtains access to data sources for which the subscriber is authorized to access while impersonating the subscriber based upon the trust relationship;
execute the matching rule to perform a test as to whether the event being monitored has occurred based upon the matching rule determining that data of the data sources matches criteria of the matching rule;
in response to the test detecting an occurrence of the event, generate and transmit a message over a network to a remote computer of the subscriber to indicate that the event has occurred; and
in response to not detecting the event, refraining from generating and transmitting the notification and not establishing the impersonation of the subscriber.

10. The computing system of claim 9, wherein the instructions to execute the matching rule comprise instructions that cause the processor to:
execute a query, as a proxy of the subscriber, upon the data sources for which the subscriber has authorization to access to extract the data used to perform the test.

11. The computing system of claim 9, wherein the instructions comprise instructions that cause the processor to:
query a security module to determine that the subscriber has access to a subset of rows and tables maintained by the enterprise computing environment based upon a user role of the subscriber and access permissions of the subscriber.

12. The computing system of claim 9, wherein the instructions comprise instructions that cause the processor to:
transmit messages to remote computing devices of a first subset of the set of subscribers based upon the matching rule determining that the event has occurred for the first subset of the set of subscribers.

13. The computing system of claim 12, wherein the instructions comprise instructions that cause the processor to:
refrain from transmitting messages to remote computing devices of a second subset of the set of subscribers based upon the matching rule determining that the event did not occur for the second subset of the set of subscribers.

14. The computing system of claim 9, wherein the instructions to execute the matching rule comprise instructions that cause the processor to:
customize the criteria of the matching rule for each subscriber by setting a value or threshold of the criteria to a subscriber specified preference.

15. A computer-implemented method, the computer-implemented method involving a computing device comprising a processor, and the computer-implemented method comprising:
defining, by the processor, a monitoring process to monitor for an occurrence of an event on each of a plurality of computing components;
assigning, by the processor, a plurality of users to the monitoring process;
executing, by the processor, the monitoring process to monitor for the event on each of the plurality of computing components;
in response to the event being detected on one component of the plurality of components, (i) generating a notification of the event, and (ii) performing an authorization by impersonating, by the processor, each selected user of the plurality of users by establishing a trust relationship between the processor and the plurality of computing components via a network access;
transmitting, by the processor, the notification to a device associated with the selected user;
in response to the authorization being unsuccessful for the selected user, bypassing, by the processor, the transmission of the notification to the selected user; and
in response to not detecting the event, refraining from generating and transmitting the notification and not establishing the impersonation of the subscriber.

16. The computer-implemented method of claim 15, further comprising:
in response to transmitting the notification, logging out as the impersonation of the selected user.

17. The computer-implemented method of claim 15, further comprising:
    creating a trusted connection using a Web Token to impersonate the user, wherein the Web Token is an access token that asserts that an entity using the Web Token is the selected user.

18. The computer-implemented method of claim 15, further comprising: for each of the selected users:
    identifying data sources for which a given user is authorized to access; and
    executing the monitoring process upon the data sources for which the given user is authorized to access.

\* \* \* \* \*

UNITED STATES PATENT AND TRADEMARK OFFICE
CERTIFICATE OF CORRECTION

PATENT NO. : 11,005,838 B2  
APPLICATION NO. : 15/979935  
DATED : May 11, 2021  
INVENTOR(S) : Tebben et al.

It is certified that error appears in the above-identified patent and that said Letters Patent is hereby corrected as shown below:

On the Title Page

Column 2, under Other Publications, Line 3, delete "www.creditcards.conn/" and insert --www.creditcards.com/--, therefor.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*